(12) United States Patent
Ting et al.

(10) Patent No.: US 9,222,064 B1
(45) Date of Patent: Dec. 29, 2015

(54) SOLVENT-FREE PROCESSES FOR MAKING LIGHT STABLE ISO-ALPHA-ACIDS DERIVATIVES FROM BOTH HOP ALPHA-ACIDS AND BETA-ACIDS RESINS

(71) Applicants: HOP TING RESOURCES, LLC., Brookfield, WI (US); BEIJING LEEBO MEGAHOPS CO., LTD, Beijing (CN)

(72) Inventors: Patrick L. Ting, Brookfield, WI (US); Lixin Zhu, Beijing (CN); Conglin Peng, Beijing (CN)

(73) Assignee: Hop Ting Resources, LLC, Brookfield, WI (US)

( * ) Notice: Subject to any disclaimer, the term of this patent is extended or adjusted under 35 U.S.C. 154(b) by 0 days.

(21) Appl. No.: 14/461,944

(22) Filed: Aug. 18, 2014

(51) Int. Cl.
| | |
|---|---|
| C12C 3/12 | (2006.01) |
| C12C 3/00 | (2006.01) |
| A23L 1/28 | (2006.01) |

(52) U.S. Cl.
CPC ... C12C 3/12 (2013.01); C12C 3/00 (2013.01); A23L 1/28 (2013.01)

(58) Field of Classification Search
CPC .................................. A23L 1/28; C12C 3/00
USPC ......................................... 426/592, 600, 655
See application file for complete search history.

(56) References Cited

U.S. PATENT DOCUMENTS

| | | | |
|---|---|---|---|
| 3,552,975 A | 1/1971 | Worden et al. | |
| 3,923,897 A | 12/1975 | Worden | |
| 4,212,895 A | 7/1980 | Laws et al. | |
| 4,234,516 A | 11/1980 | Koller et al. | |
| 4,247,483 A | 1/1981 | Baker et al. | |
| 4,324,810 A | 4/1982 | Goldstein et al. | |
| 4,342,791 A | 8/1982 | Baker | |
| 4,590,296 A | 5/1986 | Cowles et al. | |
| 4,644,084 A | 2/1987 | Cowles et al. | |
| 4,767,640 A | 8/1988 | Goldstein et al. | |
| 5,013,571 A | 5/1991 | Hay | |
| 5,296,637 A | 3/1994 | Stegink et al. | |
| 5,370,897 A | 12/1994 | Smith et al. | |
| 5,455,038 A | 10/1995 | Barney et al. | |
| 5,523,489 A | 6/1996 | Ting et al. | |
| 5,600,012 A | 2/1997 | Poyner et al. | |
| 5,767,319 A | 6/1998 | Ting et al. | |
| 5,874,633 A | 2/1999 | Ting et al. | |
| 6,020,019 A | 2/2000 | Ting et al. | |
| 6,198,004 B1 | 3/2001 | Maye et al. | |
| 6,303,824 B1 | 10/2001 | Ting et al. | |
| 7,087,256 B2 | 8/2006 | Gimbel et al. | |
| 7,344,746 B1 | 3/2008 | Wilson et al. | |
| 7,901,713 B2 | 3/2011 | Tripp et al. | |
| 2013/0150626 A1 | 6/2013 | Mertens et al. | |

FOREIGN PATENT DOCUMENTS

| | | |
|---|---|---|
| CA | 2391973 A1 | 5/2002 |
| CN | 941001490 | 12/1994 |
| EP | 1230337 B1 | 11/1999 |
| EP | 2580312 | 12/2011 |
| WO | 0136581 A1 | 5/2001 |

OTHER PUBLICATIONS

Anteunis et al.; On the Hydrogenation of Humulone Part II; Bull. Soc. Chim. Belg.; 1959; pp. 315-324: vol. 68; US.
Brown et al.; Chemistry of Hop Constituents, Part XIII; J. Chem. Soc., 1959; pp. 545-551; US.
Hay et al.; Efficient One-Step Preparation of the Beer Additive Tetrahydroiso a-Acids; J. Agric. Food Chem.; 1991, vol. 39; pp. 1732-1734; US.
Ting et al.; Preparation and Purification of Hops Acids and Their Derivatives: American Society of Brewing Chemists, Inc.; 1996; Publication No. J-1996-0319-01R; pp. 103-109; US.
Huvaere et al.; Photooxidative Degradation of Beer Bittering Principles: A Key Step on the Route to Lightstruck Flavor Formation in Beer; Journal of Agricultural and Food Chemistry; 2005; vol. 53; pp. 1489-1494; US.
Intelmann et al.; Comprehensive Sensomios Analysis of Hop-Derived Bitter Compounds during Storage of Beer: Journal of Agricultural and Food Chemistry, 2011; vol. 59; pp. 1939-1953; US.
International Search Report from PCT/US2015/036596; Filed Jun. 19, 2015.

*Primary Examiner* — Elvis O Price
(74) *Attorney, Agent, or Firm* — Boyle Fredrickson, S.C.

(57) ABSTRACT

Tetrahydro iso-α-acids and hexahydro iso-α-acids are prepared from β-acid resins in the presence of α-acids derivatives without the use of conventional organic solvents. Specifically, the hydrogenation and hydrogenolyzis step is performed using a liquefied hop resin composed of β-acids and α-acid derivatives, hydrogen, and a noble metal hydrogenation catalyst to form desoxytetrahydro α-acids and hydrogenated iso-α-acid derivatives (e. g., tetrahydroiso- and hexahydro iso-α-acids). The desoxytetrahydro α-acids are subsequently auto-oxidized and isomerized by the spent noble metal catalyst in an aqueous alkaline solution (without adding peracids, lead, calcium, or magnesium salts) into the desired tetrahydro iso-α-acids and hexahydro iso-α-acids.

19 Claims, 3 Drawing Sheets

SOLVENT-FREE PROCESSES FOR MAKING LIGHT STABLE ISO-ALPHA-ACIDS DERIVATIVES FROM BOTH HOP ALPHA-ACIDS AND BETA-ACIDS RESINS

FIELD OF THE INVENTION

The present invention relates generally to brewing and hop processes and to the production of tetrahydro iso-α-acids (tetrahydro isohumulones) and hexahydro iso-α-acids (hexahydro isohumulones) from hops (*Humulus lupulus*) or hop extracts. More particularly, the invention is directed to the compositions and methods for hydrogenating and hydrogenolysis of β-acids and α-acids derivative in a solvent free condition.

BACKGROUND OF THE INVENTION

Hops have long been used in brewing to impart bitterness, flavor, foam, and preservatives in beer. The hop plant, *humulus lupulus*, produces hop cones. These cones contain soft resins, which may be extracted by solvents such as $CO_2$ and ethanol. The extract contains alpha(α)-acids, beta(β)-acids, hop oils, and other unknown substances, which have widely been used in brewing. In the brewing process, the α-acids undergo an isomerization reaction in boiling wort to produce iso-α-acids which contribute bitterness, foam, and antimicrobial activity in finished beer. Most of the β-acids are precipitated and discarded as a by-product due to their low solubility, with no bitterness or flavor significance in beer.

Naturally occurring hop acids may be classified and defined into three classes: a group of six-membered-ring containing α-acids (humulones), five-membered-ring containing isomerized α-acids (iso-α-acids or isohumulones), and six-membered-ring containing β-acids (lupulones) (see FIGS. 1 and 2). Each class also contains at least five analogous forms, differentiated with one side-chain with an R subgroup (isopropyl, isobutyl, sec-butyl, isopentyl, and ethyl; corresponding to a prefix of co, n, ad, pre, and post, respectively). For example, the α-acids consist of cohumulone, (n)-humulone, adhumulone, prehumulone, and posthumulone with corresponding isomerized derivatives as isocohumulone, isohumulone, isoadhumulone, isoprehumulone, and isoposthumulone. In the same manner, the β-acids consist of colupulone, (n)-lupulone, adlupulone, postlupulone, and prelupulone. Typically, hops are extracted with liquid or supercritical $CO_2$ to an extract consisting of α-acids, β-acids, hop oils, and unknown waxes. Cowles et al. (U.S. Pat. No. 4,590,296), hereby incorporated by reference, teaches a method of separating α-acids, β-acids and hop oils from the $CO_2$ hop extract in aqueous solutions by a pH partitioning technique. The α-acids are then converted to iso-α-acids by heat and alkali in an aqueous suspension, typically in the presence of magnesium ions to accelerate the isomerization reaction (Koller et al. U.S. Pat. No. 4,234,516), hereby incorporated by reference, and acidified to afford a pure iso-α-acids resin. Alternatively, Laws et al. (U.S. Pat. No. 4,212,895), Baker et al. (U.S. Pat. No. 4,247,483), Baker (U.S. Pat. No. 4,342,791), Smith & Wilson (U.S. Pat. No. 5,370,897), all of which are hereby incorporated by reference, teach the α-acids present in the $CO_2$ extract may be pre-isomerized to iso-α-acids and then separated from the mixture of β-acids, hop oils and waxes by a pH partitioning technique.

Beers brewed with natural iso-α-acids packaged in clear or green bottles are susceptible to light and UV damages to generate unpleasant skunk or light struck flavors. These flavors have been attributed to the formation of 3-methyl-2-butene-2-thiol (3M2B1T) via a photolysis reaction between iso-α-acids and naturally occurring sulfur compounds in beer (Huvarer, et al. *J. Agric. Food Chem.* 2005, 53, 1489-1494), hereby incorporated by reference. An isohexenoyl side chain on the iso-α-acids moiety is susceptible to light degradation to generate 3M2B1T and related sulfur compounds. The 3M2B1T has extremely low thresholds at about 2 to 4 ng/L (part per trillion) in lager beers to be perceived as undesired. Furthermore, iso-α-acids are found to be unstable during storage with the same isohexenoyl side chain sensitive to oxidative and non-oxidative degradation to produce stale flavors perceived as papery or cardboard. The oxidation reaction of iso-α-acids in beer also causes a loss of bitterness values and shortens the shelf life of beer. A recent report indicated that trans-iso-α-acids (one isomer of iso-α-acids) have been verified to degrade via a cyclization reaction and leads to a lingering, harsh, and astringent bitter tastes during storage (Intelmann, et al. *J. Agric. Food Chem.* 2011, 59, 1939-1953), hereby incorporated by reference. In recent years, new technologies have resulted in advanced hop products, which are both light and oxidation resistant hop bittering compounds mostly derived from α-acids and iso-α-acids (Ting et al. *J. Am. Soc. Brew. Chem.* 54(2):103-109, 19960), hereby incorporated by reference. Goldstein et al. (U.S. Pat. Nos. 4,324, 810 & 4,767,640) and Gimble et al. (U.S. Pat. No. 7,087,256), all of which are hereby incorporated by reference, teach methods of making light stable dihydro iso-α-acids (or rho-iso-α-acids) by sodium borohydride ($NaBH_4$) reduction via a one or two-step process. The key steps for making advanced products involve either a reduction of a carbonyl (C=O) to a hydroxyl (CH—OH) on the isohexenoyl side chain to form dihydro iso-α-acids (rho-iso-α-acids), or a hydrogenation of(C=C) double bonds to (CH—CH) single bonds to form tetrahydro α-acids, tetrahydro iso-α-acids, or combining both treatments to form hexahydro iso-α-acids (see FIG. 1). These treatments affect the properties of iso-α-acids toward light and oxidative stabilities, sensorial bitterness, foam retention, as well as anti-microorganism strength. The light stable iso-α-acids derivatives or advanced hop bittering products have been commonly used for brewing light stable beer, enhancing foam, adjusting bitterness, and strengthening anti-microorganisms. Their effects are in a relative order of tetrahydro>hexahydro>iso-α-acids. Of the advanced products, tetrahydro iso-α-acids and hexahydro iso-α-acids are more valuable and important than the others in brewing. They are also applicable for non-brewing usages in other beverages, health supplements and foods. For example, Barney et al. (U.S. Pat. No. 5,455,038), hereby incorporated by reference, discovered that tetrahydro isohumulone and hexahydro colupulone are superior agents for inhibiting *Listeria* than beta-acids. Tripp et al. (U.S. Pat. No. 7,901,713), hereby incorporated by reference, discloses a method of treating an inflammatory condition comprising a therapeutically effective amount of dihydro iso-α-acids, tetrahydro iso-α-acids, and hexahydro iso-α-acids.

The original resins or free acid forms of α-acids, iso-α-acids, dihydro iso-α-acids, tetrahydrop iso-α-acids, and hexahydro iso-α-acids are viscous liquids, except β-acids which are solids having a melting point between 85° to 93° C. They are less soluble in water but soluble in most organic solvents as well as liquid/supercritical $CO_2$. They are also soluble in alkaline aqueous solutions as salt forms and are commercially available in 5%-40% (w/w) aqueous solution. The salt forms are possibly dissociated in alcohols.

A typical hydrogenation reaction simply adds hydrogen to a double or triple bond connecting two atoms in the structure. Thus, hop acids containing multiple unsaturated (C=C) side chains are applicable to be hydrogenated with hydrogen and a hydrogenation catalyst to the hydrogenated hop acids. The hop acids are commonly performed in conventional organic, alcoholic, $CO_2$ and/or aqueous solvent in one form or another. One strategy of making tetrahydro iso-α-acids and hexahydro iso-α-acids starts from the α-acids and the chemistry is illustrated in FIG. 1.

Several methods of preparing tetrahydro iso-α-acids from the α-acids, rather than from the less valuable β-acids, are disclosed. Anteunis & Verzele (*Bull. Soc. Chim. Belg.* Vol. 68, 1959, 315-324), hereby incorporated by reference, teaches a hydrogenation of α-acid (humulone) in methanol to tetrahydro iso-α-acid (tetrahydrohumulone). Brown, Howard & Tatchell (*J. Chem. Soc.* 1959, 545-551), hereby incorporated by reference, teaches an isomerization of hydrogenated α-acids to corresponding tetrahydro iso-α-acids in ethanolic alkali solution and a hydrogenation of isomerized α-acids in ethanol. However, the hydrogenation of the α-acids reaction in methanol or ethanol often causes undesirable hydrogenolyzed (cleaved) α-acids by-products. Hay & Homiski (*J. Agric. Food Chem.* 1991, 39, 1732-1734), Hay (U.S. Pat. No. 5,013,571), and Poyner et al. (U.S. Pat. No. 5,600,012), all of which are hereby incorporated by reference, disclose the hydrogenation of iso-α-acids in aqueous, aqueous alcohol or chlorinated hydrocarbon solution to form tetrahydro iso-α-acids. Stegink et al. (U.S. Pat. No. 5,296,637), hereby incorporated by reference, demonstrates a hydrogenation of α-acids as alkaline metal salts in aqueous or alcoholic solution followed by isomerization. Ting et al. (U.S. Pat. Nos. 5,523, 489; 5,767,319; 5,874,633 and 6,303,824), all of which are hereby incorporated by reference, claim the hydrogenation of iso-α-acids or their metal salts in either aqueous alcohol or alcohol solutions to form tetrahydro iso-α-acids. Ting et al. (U.S. Pat. No. 6,020,019) and Wilson & Smith (U.S. Pat. No. 7,344,746, EP 1230337, WO 2001036581, & CA 2391973), all of which are hereby incorporated by reference, disclose the processes of hydrogenation of hop acids in liquid/supercritical $CO_2$ to produce high purity of tetrahydro iso-α-acids and hexahydro iso-α-acids. The prior art teach a process of making tetrahydro iso-α-acids via either a hydrogenation of α-acids to tetrahydro α-acids followed by isomerization or a reversed process by isomerization of α-acids to iso-α-acids followed by the hydrogenation. The disadvantage is using and recycling the solvents.

The preparation of hexahydro iso-α-acids are an easier task involving either a chemical reduction of the carbonyl (C=O) to a hydroxyl (CH—OH) on the isohexenoyl side chain of iso-α-acids using sodium borohydride before the hydrogenation, or reversal of the process. Worden & Todd (U.S. Pat. No. 3,552,975), hereby incorporated by reference, discloses a method of preparing hexahydro iso-α-acids using alkali metal borohydride reduction of tetrahydro iso-α-acids in organic solvents. Hay (U.S. Pat. No. 5,013,571), hereby incorporated by reference, teaches a reversal of the necessary reducing agents from α-acids or iso-α-acids to hexahydro iso-α-acids. Wilson & Smith (U.S. Pat. No. 7,344,746, EP 1230337 and CA 2391973), all of which are hereby incorporated by reference, claim a method of hydrogenation of dihydro iso-α-acids to hexahydro iso-α-acids in a solvent-free or $CO_2$ system. Mertens et al. (EP 2580312), hereby incorporated by reference, discloses a method of employing ruthenium-containing catalyst that catalyzes the hydrogenation of both C=C and C=O bonds on the side-chain of iso-α-acids or tetrahydro iso-α-acids to produce hexahydro iso-α-acids either in a solvent-free condition, or in the presence of a solvent phase (e.g., carbon dioxide, water, ethanol, organic solvent, or mixtures thereof).

Another strategy of making tetrahydro iso-α-acids and hexahydro iso-α-acids may be prepared from β-acids (lupulones) and the chemistry is illustrated in FIG. 2. It is valuable because the β-acids are normally discarded as by-products in hops and brewing. Both α-acids and β-acids have a common six-membered ring base structure that differs in that where the α-acids have an active hydroxyl (OH) group while the β-acids have an inactive five-carbon alkenyl group at C-4 position. The mechanisms of preparing tetrahydro iso-α-acids from the β-acids are different from that of the α-acids, in which one of the vicinal isopentyl (5 carbon alkenyl) side-chains on the β-acids moiety is cleaved to form desoxytetrahydro α-acids (retaining a six-membered ring structure) by a hydrogenolysis reaction and then substituted with an OH group by an oxidation to form tetrahydro α-acids prior to the isomerization reaction. The hydrogenolysis adds hydrogen and results in dissociation (breaking up) of the molecule (or called destructive hydrogenation). The hydrogenation and hydrogenolysis reaction is usually performed under mild and controllable conditions because the reaction is exothermic and fast. It is commonly practiced with hydrogen and a noble metal hydrogenation catalyst in the presence of solvents. Alcoholic and organic solvents have been used for the hydrogenation and hydrogenolysis for many years as solvents. Most commonly used active oxidation agents are oxygen, air, hydrogen peroxide, and peracids, in which the oxidation occurs in air as an auto-oxidation.

Worden & Todd (U.S. Pat. No. 3,552,975), hereby incorporated by reference, teaches a method of hydrogenolysis of β-acids using palladium on carbon and hydrogen in an acidic methanol (adding hydrochloric acid or HCl) to form desoxytetrahydro α-acids (intermediates or precursors of tetrahydro α-acids); then oxidizing the intermediates with air in the presence of lead salt to produce lead salts of tetrahydro α-acids and isomerize the free tetrahydro α-acids in an alkaline solution to the final tetrahydro iso-α-acids. The hydrogenolysis takes place in methanol with adding corrosive HCl. The final product is a crude mixture from which the lead residues can only be removed with great difficulty. The presence of residual lead in products to be consumed is undesirable. Worden (U.S. Pat. No. 3,923,897), hereby incorporated by reference, discloses an improvement on the prior art (U.S. Pat. No. 3,552,975) using organic peracids to replace lead salt and air in a water immiscible organic solvent and adding magnesium or calcium salts for the isomerization. The process does not utilize lead salt but it is conducted in water immiscible organic solvents and it involves cumbersome solvent changes, which increase process cost. The presence of even residual amounts of such solvents and organic peracids in food products, such as beverages, is undesirable. Cowles et al. (U.S. Pat. No. 4,644,084), hereby incorporated by reference, discloses a method of making tetrahydro iso-α-acids involving a hydrogenolysis of β-acids in a sulfuric acid ($H_2SO_4$) added ethanol solution to form desoxytetrahydro α-acids followed by a simultaneous oxidation and isomerization reaction in an aqueous ethanol mixture containing alkaline and magnesium salt and purging with air to form the desired tetrahydro iso-α-acids. Although this art eliminates using organic peracids, lead salt and water immiscible organic solvent, it still uses sulfuric acid, ethanol, magnesium salt, and aqueous ethanol.

The prior art discovered that the hydrogenolysis of the β-acids to desxoytetrahydro α-acids are performed in acidic solvents (commonly uses methanol or ethanol with HCl or $H_2SO_4$). Worden & Todd (U.S. Pat. No. 3,552,975), hereby incorporated by reference, claims specifically that the hydrogenolysis of the β-acids in a pH not greater than 1 in alcohols or ether, otherwise, favors the hydrogenation of C═C double bonds. Ting et al. (U.S. Pat. No. 6,020,019), hereby incorporated by reference, claims the hydrogenolysis of the β-acids in $CO_2$ occurs with adding an acidic alcohol modifier. Thus under higher pH (no inorganic acids) conditions, the hydrogenation is more dominant and produces dihydro, tetrahydro, or hexahydro β-acids derivatives than the hydrogenolysis to form desoxytetrahydro α-acids. Wilson & Smith (U.S. Pat. No. 7,344,746, EP 1230337, WO 2001036581, & CA 2391973), all of which are hereby incorporated by reference, confirms that a direct hydrogenation of the β-acids or in $CO_2$ resulted in no occurrence of the hydrogenolysis reaction. Furthermore, inorganic acids (HCl, $H_2SO_4$ and $H_3PO_4$) are very corrosive and laborious removal from the process.

Both hydrogenation and hydrogenolysis are well-known processes, which are commonly employed in many organic chemical synthesis schemes, including the manipulation of the β-acids, the α-acids, and their derivatives. Alcohols and other organic compounds have been used for many years as solvents in these processes. Although ethanol, $CO_2$, or organic solvents may be recovered in practice, the costs of capital equipment and the loss of such solvents (during the process due to handling, reaction, and evaporation), environmental problems and residual solvent contamination of the final product associated with organic solvents are usually unavoidable and significant. One can readily appreciate that a neat (solvent-free) process, which avoids using solvents, inorganic acids, and other artifacts, would be of economical benefits, significantly important, and valuable.

May et al. (U.S. Pat. No. 6,198,004), hereby incorporated by reference, discloses a method of hydrogenation of iso-α-acids in an alkaline aqueous solution to tetrahydro iso-α-acids using a noble metal catalyst wherein, the catalyst is added incrementally or continuously throughout the hydrogenation step. Smith & Wilson (CA 2391973) and Mertens et al. (EP 2580312), both of which are hereby incorporated by reference, disclose a process for direct hydrogenation of the α-acids derivatives in the absence of any conventional organic solvent, $CO_2$, and aqueous to produce tetrahydro iso-α-acids and hexahydro iso-α-acids. Smith & Wilson (CA 2391973), hereby incorporated by reference, discloses a direct hydrogenation of β-acids to produce only the hydrogenated (β-acids derivatives and no hydrogenolyzed products. None of the prior art have disclosed a solvent-free hydrogenolysis of the β-acids to form desoxytetrahydro α-acids. The Smith & Wilson (CA 2391973) and Mertens et al. (EP 2580312) solvent-free methods are limited to the α-acids resin and iso-α-acids derivatives having advantages and benefits of no solvents, lower equipment costs, and higher output than those using conventional solvent processes. It would be highly appreciated if the hydrogenolysis of the β-acids can be performed under a solvent-free and clean system.

A preferred strategy of making tetrahydro iso-α-acids and hexahydro iso-α-acids is from both α-acids and β-acids and the chemistry is illustrated as FIGS. 1, 2 and 3. A Chinese Patent (CN 94100149.0), hereby incorporated by reference, discloses a method of converting both α-acids and β-acids to tetrahydro iso-α-acids involving a hydrogenation and hydrogenolysis of an extract comprising pre-isomerized α-acids (iso-α-acids) and β-acids in ethanol, hydrogen and palladium on carbon as catalyst to simultaneously produce tetrahydro iso-α-acids and desoxytetrahydro α-acids, respectively. The spent palladium catalyst is filtered out. The oxidation and isomerization of desoxytetrahydro α-acids are conducted with magnesium salts and air in an aqueous alkaline ethanol solution similar to the Cowles et al. (U.S. Pat. No. 4,644,084) procedures. It results in total tetrahydro iso-α-acids from both α-acids and β-acids. This method has advantages of utilizing both α-acids and β-acids without adding inorganic acid. However, unavoidably it uses ethanol, aqueous ethanol and magnesium salts. The disadvantages of the prior art (i.e., CN 94100149.0) are complication, costs of recovering ethanol and removing magnesium salt. Particularly, a common problem of using solvents is its residues remaining in the final products, which have concerns of off-flavor or health; for example, a residual esters aroma is often a concern for some brewers due to an esterification of residual methanol or ethanol. It would be desirable to have a method of converting α-acids and β-acids into tetrahydro iso-α-acids without the use of solvents, inorganic acids, or magnesium salt.

SUMMARY OF THE INVENTION

In the present invention, β-acids can be directly hydrogenolyzed in the same process as the hydrogenation of either iso-α-acids or dihydro iso-α-acids in a solvent-free system, with the spent (used) noble metal catalyst after the hydrogenation and hydrogenolysis reaction catalyzing the auto-oxidation/isomerization without peracids, lead, calcium, or magnesium salts. The reactions may be performed in a one-pot process. The inventors recognize the homogeneity and fluidity of the β-acids (melting point about 85° to 93° C.) resin in the presence of either α-acids or the α-acids derivatives (e.g., iso-α-acids derivatives including iso-α-acids and dihydro iso-α-acids) under lower temperatures. This phenomenon inspired the concept of a neat or solvent-free hydrogenolysis of the β-acids resin. The inventors also found that the desoxytetrahydro α-acids are readily auto-oxidized/isomerized to tetrahydro iso-α-acids in an aqueous alkaline solution while heating and separating the reaction mixture from the spent noble metal catalyst.

It is an object of the present invention to disclose a solvent-free method of preparing tetrahydro iso-α-acids and hexahydro iso-α-acids from both α-acids and β-acids. A preferred embodiment comprises compositions of β-acids and selected organic acids in a liquid form with hydrogen and a noble metal hydrogenation catalyst for the hydrogenation and hydrogenolysis; and the spent noble metal hydrogenation catalyst catalyzes the auto-oxidization/isomerization to form tetrahydro iso-α-acids, and further reduces to hexahydro iso-α-acids.

It is another object to disclose a solvent-free method of preparing tetrahydro iso-α-acids and hexahydro iso-α-acids from a composition of β-acids and iso-α-acids, hydrogen, a noble metal hydrogenation catalyst, and air as the reactive agents in the absence of conventional organic solvents, inorganic acids, and divalent metal ions.

It is a further object to disclose a solvent-free method of preparing tetrahydro iso-α-acids and hexahydro iso-α-acids from a composition of β-acids and dihydro iso-α-acids, hydrogen, a noble metal hydrogenation catalyst, and air as the reactive agents in the absence of conventional organic solvents, inorganic acids, and divalent metal ions.

A first aspect of the present invention provides a method for reacting a mixture of β-acids and an organic acid where the organic acid is selected from a group consisting of formic acid, acetic acid, fatty acids, hop acids, α-acids, and the α-acids derivatives, a hydrogen gas, and a hydrogenation catalyst (supported Pd, Pt, Ru, Ni) without using any solvent (organic, alcohols, $CO_2$ and water) and inorganic acid (HCl, $H_2SO_4$, $H_3PO_4$) to form a mixture; reacting the mixture under suitable conditions to thereby hydrogenolyze the β-acids to form desoxytetrahydro α-acids; auto-oxidizing/isomerizing the reaction mixture to form tetrahydro iso-α-acids in an aqueous alkaline solution and/or reduced to hexahydro iso-α-acids.

A second aspect of the present invention provides a method for reacting a mixture of β-acids and preferably iso-α-acids in a liquid form, hydrogen, and a hydrogenation catalyst (supported Pd, Pt, Ru, Ni) without using any solvent (organic, alcohols, $CO_2$ and water) and inorganic acid (HCl, $H_2SO_4$, $H_3PO_4$) to form a mixture; reacting the mixture under suitable conditions to thereby hydrogenolyze the β-acids to desoxytetrahydro α-acids and hydrogenate the iso-α-acids to tetrahydro iso-α-acids; auto-oxidizing/isomerizing the reaction mixture in an aqueous alkaline solution to total tetrahydro iso-α-acids (derived from both α-acids and β-acids) and/or reduced to hexahydro iso-α-acids.

A third aspect of the present invention provides a method of reacting a mixture of β-acids and preferably dihydro iso-α-acids in a liquid form, hydrogen, and a hydrogenation catalyst (supported Pd, Pt, Ru, Ni) without using any solvent (organic, alcohols, $CO_2$, and water) and inorganic acid (HCl, $H_2SO_4$, $H_3PO_4$) to form a mixture; reacting the mixture under suitable conditions to thereby hydrogenolyze the β-acids to form desoxytetrahydro α-acids and hydrogenate the dihydro iso-α-acids to form hexahydro iso-α-acids; auto-oxidizing/isomerizing the reaction mixture in an aqueous alkaline solution to produce tetrahydro iso-α-acids and hexahydro iso-α-acids, respectively.

A fourth aspect of the present invention provides a method of recovering tetrahydro iso-α-acids (derived from the α-acids) in an aqueous alkaline solution by a pH partitioning technique from a mixture containing the desoxytetrahydro α-acids and the spent noble metal hydrogenation catalyst made according to the method of the second aspect of the invention.

A fifth aspect of the present invention provides a method of recovering hexahydro iso-α-acids (derived from the α-acids) in an aqueous alkaline solution by a pH partitioning technique from a mixture containing the desoxytetrahydro α-acids and the spent noble metal hydrogenation catalyst made according to the method of the third aspect of the invention.

A sixth aspect of the presentation provides a method of one-step auto-oxidizing/isomerizing the desoxytetrahydro α-acids in the presence of the spent noble metal hydrogenation catalyst and an aqueous alkaline solution made according to the first, second, third, fourth and fifth aspects of the invention to tetrahydro iso-α-acids (made from the β-acids).

The present invention provides a neat, clean and simple one-pot method of preparing light stable iso-α-acids derivatives (e.g., tetrahydro iso-α-acids and hexahydro iso-α-acids) from both α-acids and β-acids. A resin of the β-acids and the α-acids derivatives is subjected to a successive hydrogenation/hydrogenolysis reaction, auto-oxidation/isomerization reaction, and formulation to a final desired aqueous product in just one reactor. It avoids length separation and purification of intermediates which would save time and resources while increasing yield, fewer costs, highly output, and adding hops valuation over the prior art.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE INVENTION

Figure 1:
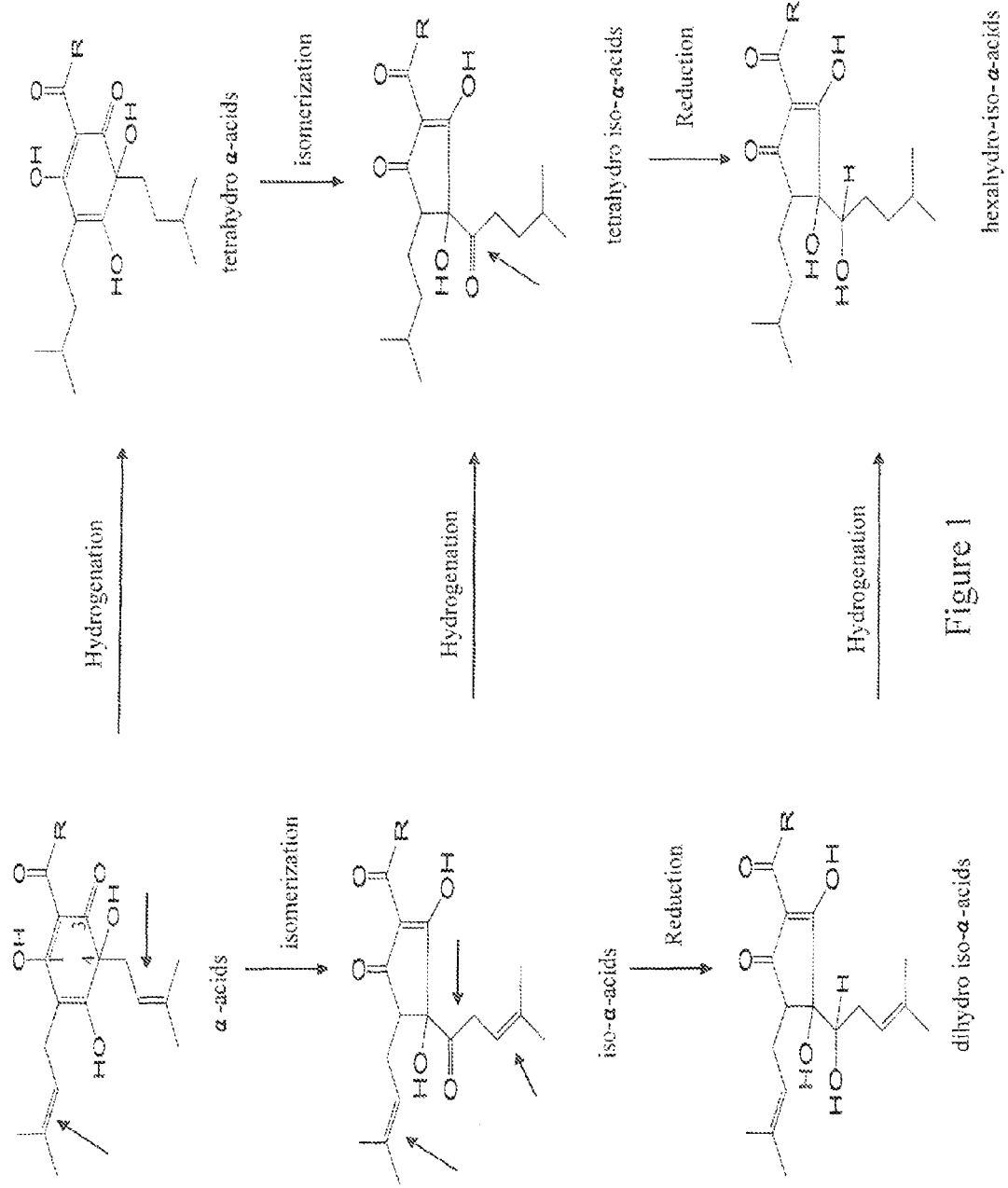
FIG. 1 is a schematic diagram of the chemistry of preparing tetrahydro- and hexahydro iso-α-acids from α-acids.
Figure 2:
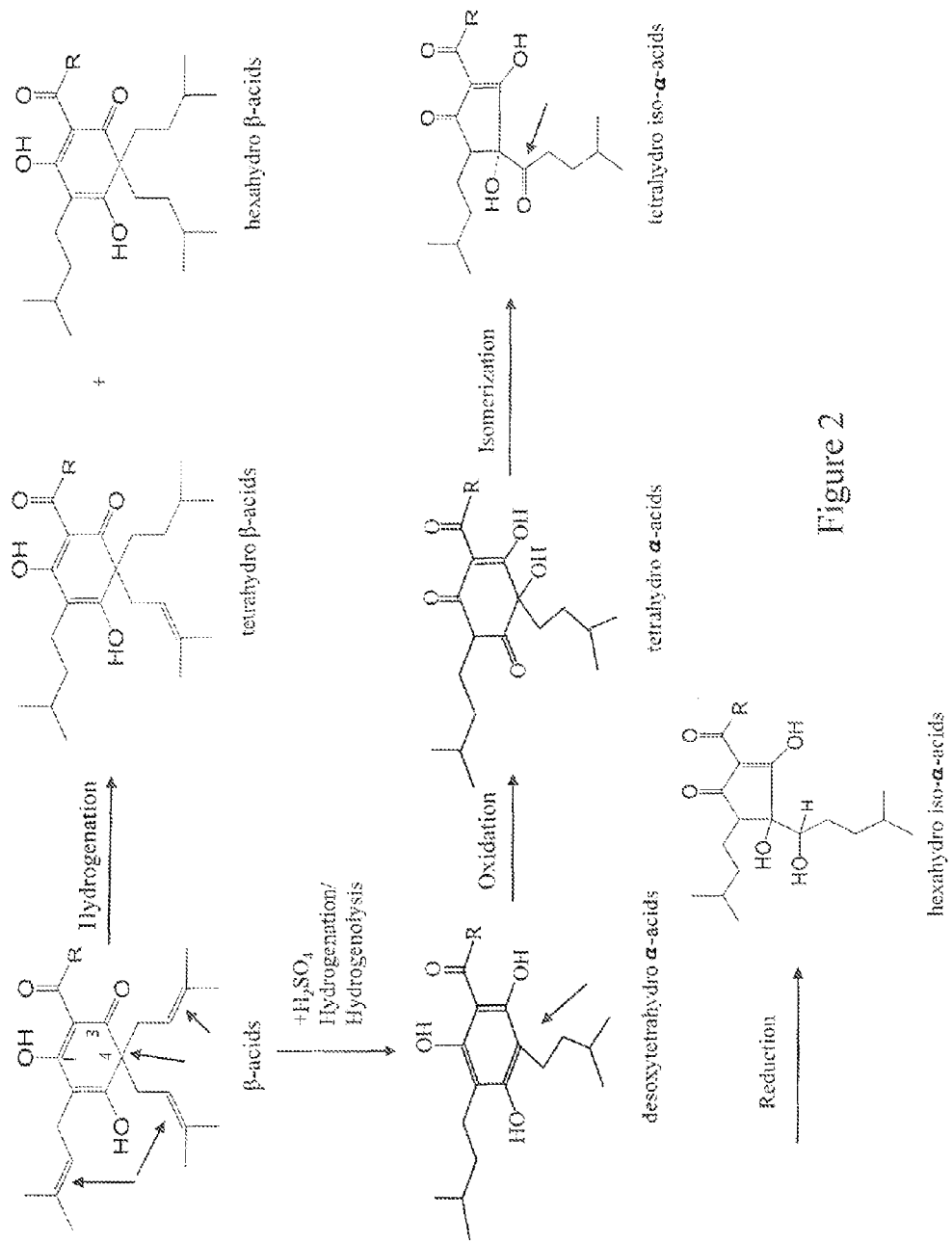
FIG. 2 is a schematic diagram of the chemistry of preparing tetrahydro- and hexahydro iso-α-acids from β-acids.
Figure 3:
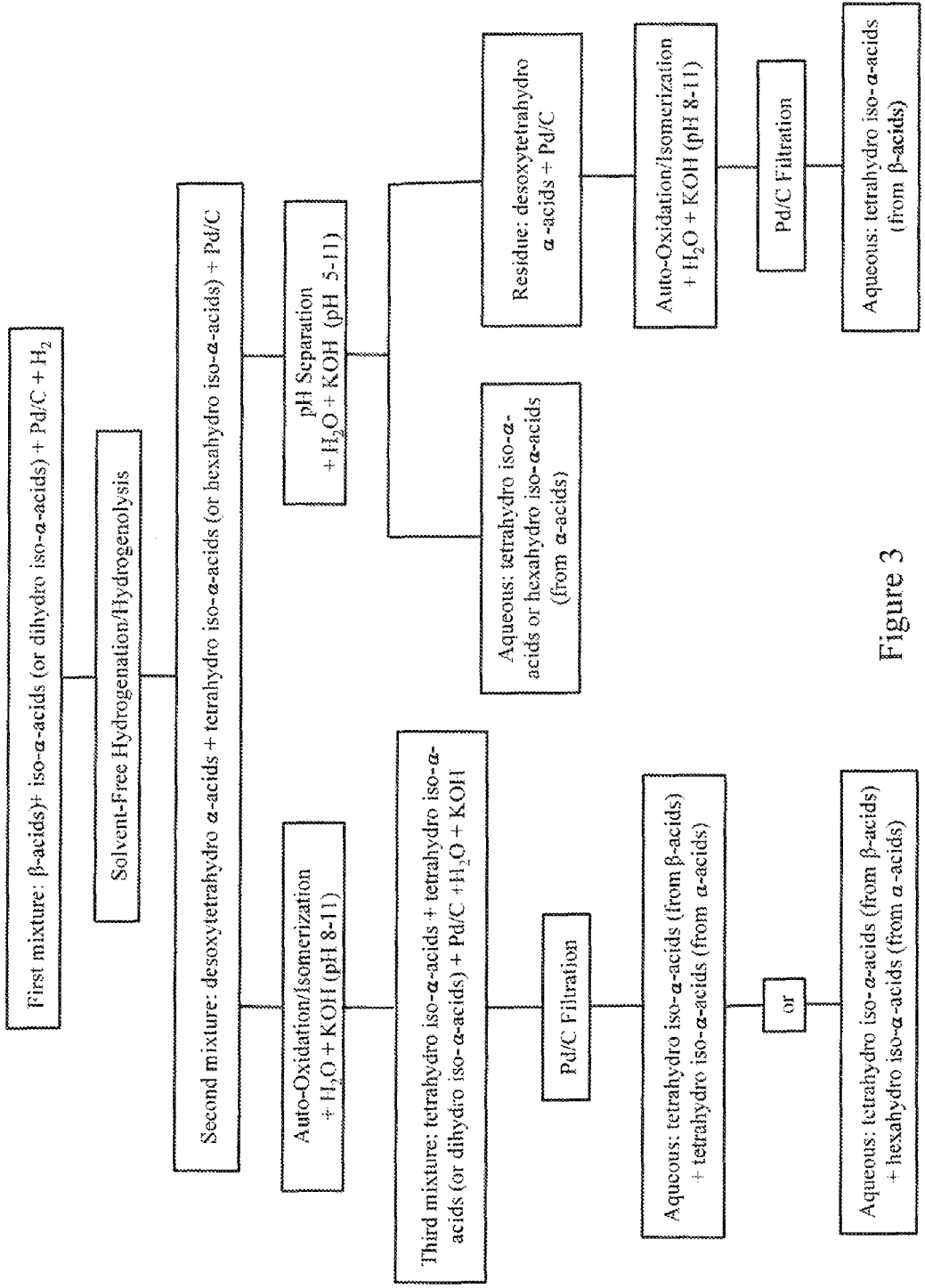
FIG. 3 is a flowchart diagram showing the method steps of the present invention.

In the practice of the method of the present invention, a mixture comprising of a composition of β-acids and an organic acids (selected from a group consisting of formic acid, acetic acid, fatty acids, hop α-acids, and hop α-acids derivatives) between about 5% to about 95% or between about 1:20 to about 20:1 by weight to form a fluidized β-acids resin at a temperature between about 20° to about 100° C. The liquefied β-acids resin is treated with a hydrogen gas or a $CO_2$ diluted hydrogen gas mixture at a pressure of about 0 to about 200 kg/cm² (abut 0 to about 20 MPa) in the presence of a hydrogenation catalyst (supported noble metal catalyst, Pd/C, Pt/C, Ru/C, or Ni/C) at a temperature of about 35° to about 100° C. to form a desoxytetrahydro α-acids resin. In one embodiment, the whole reaction mixture is suspended in an aqueous alkaline solution (NaOH, KOH, $Na_2CO_3$ or $K_2CO_3$) at a pH between about 8 to about 11 without adding peracids, lead, calcium, or magnesium salts and auto-oxidized/isomerized at a temperature between about 55° to about 100° C. to form a tetrahydro iso-α-acids solution which is recovered from the spent noble metal catalyst. A tetrahydro iso-α-acids resin is freed from the aqueous solution by acidification.

In an alternative embodiment, the whole reaction mixture containing the desoxytetrahydro α-acids, an organic acid and the spent noble metal catalyst is suspended in an aqueous alkaline solution (NaOH, KOH, $Na_2CO_3$, or $K_2CO_3$) at a pH between about 5 and about 11 to separate the solution containing the organic acid from a residue. The residue containing the remaining desxoytetrahydro α-acids and the spent noble metal catalyst is re-suspended in an aqueous alkaline solution at a pH between about 8 to about 11 without adding peracids, lead, calcium, or magnesium salts and auto-oxidized/isomerized at a temperature between about 55° to about 100° C. to form a tetrahydro iso-α-acids solution (made from the β-acids) which is recovered from the spent noble metal catalyst.

In the practice of the method of the present invention, a mixture preferably comprising of a composition of β-acids and iso-α-acids between about 5% to about 95% or between about 1:20 to about 20:1 by weight to form a fluidized hop resin at a temperature between about 20° to about 100° C. The liquefied hop resin is treated with a hydrogen gas or a $CO_2$ diluted hydrogen gas mixture at a pressure of about 0 to about 200 kg/cm² (abut 0 to about 20 MPa) in the presence of a hydrogenation catalyst (supported noble metal catalyst, Pd/C, Pt/C, Ru/C, or Ni/C) at a temperature of about 35° to about 100° C. to simultaneously form a desoxytetrahydro α-acids and tetrahydro iso-α-acids resin. In one embodiment, the whole reaction mixture containing the desoxytetrahydro α-acids, the tetrahydro iso-α-acids and the spent noble metal catalyst is suspended in an aqueous alkaline solution (NaOH, KOH, $Na_2CO_3$ or $K_2CO_3$) at a pH between about 8 to about 11 without adding peracids, lead, calcium, or magnesium salts and auto-oxidized/isomerized at a temperature between about 55° to about 100° C. to form a β-acids derived tetrahydro iso-α-acids solution in the presence of the α-acids derived tetrahydro iso-α-acids. Thus total tetrahydro iso-α-acids solution made from both α-acids and β-acids are recovered from the spent noble metal catalyst.

In an alternative embodiment, the whole reaction mixture containing the desoxytetrahydro α-acids, the tetrahydro iso-α-acids and the spent noble metal catalyst is suspended in an aqueous alkaline solution (NaOH, KOH, $Na_2CO_3$, or $K_2CO_3$) at a pH between about 5 and about 11 to recover an aqueous tetrahydro iso-α-acids (originated from the α-acids) solution from a residue. The residue containing the remaining desxoytetrahydro α-acids and the spent noble metal catalyst is re-suspended in an aqueous alkaline solution at a pH between about 8 to about 11 without adding peracids, lead, calcium, or magnesium salts and auto-oxidized/isomerized at a temperature between about 55° to about 100° C. to form another tetrahydro iso-α-acids (made from the β-acids) solution which is recovered from the spent noble metal catalyst.

In the practice of the method of the present invention, a mixture preferably comprising of a composition of β-acids and dihydro iso-α-acids between about 5% to about 95% or between about 1:20 to about 20:1 by weight to form a fluidized hop resin at a temperature between about 20° to about 100° C. The liquefied hop resin is treated with a hydrogen gas or a $CO_2$ diluted hydrogen gas mixture at a pressure of about 0 to about 200 $kg/cm^2$ (about 0 to about 20 MPa) in the presence of a hydrogenation catalyst (supported noble metal catalyst, Pd/C, Pt/C, Ru/C, or Ni/C) at a temperature of about 35° to about 100° C. to simultaneously form a desoxytetrahydro α-acids and hexahydro iso-α-acids resin. In one embodiment, the whole reaction mixture containing the desoxytetrahydro α-acids, the hexahydro iso-α-acids and the spent noble metal catalyst is suspended in an aqueous alkaline solution (NaOH, KOH, $Na_2CO_3$ or $K_2CO_3$) at a pH between about 8 to about 11 without adding peracids, lead, calcium, or magnesium salts and auto-oxidized/isomerized at a temperature between about 55° to about 100° C. to form a β-acids derived tetrahydro iso-α-acids solution in the presence of the α-acids derived hexahydro iso-α-acids. Thus a mixture of tetrahydro iso-α-acids and hexahydro iso-α-acids made from both α-acids and β-acids are recovered from the spent noble metal catalyst.

In an alternative embodiment, the whole reaction mixture containing the desoxytetrahydro α-acids, the hexahydro iso-α-acids and the spent noble metal catalyst is suspended in an aqueous alkaline solution (NaOH, KOH, $Na_2CO_3$, or $K_2CO_3$) at a pH between about 5 and about 11 to recover an aqueous hexahydro iso-α-acids (originated from the α-acids) solution from a residue. The residue containing the remaining desxoytetrahydro α-acids and the spent noble metal catalyst is re-suspended in an aqueous alkaline solution at a pH between about 8 to about 11 without adding peracids, lead, calcium, or magnesium salts and auto-oxidized/isomerized at a temperature between about 55° to about 100° C. to form a tetrahydro iso-α-acids (made from the β-acids) solution which is recovered from the spent noble metal catalyst.

EXAMPLES

Particular embodiments of our invention are shown in the following examples:

Example 1

A Solvent-Free Hydrogenation of Iso-α-Acids

The autoclave was charged with 300 g of iso-α-acids resin containing 234 g of iso-α-acids (78% by high pressure liquid chromatography or HPLC) and 4.5 g of β-acids, followed by 19.72 g of 7.5% Pd/C. The mixture was stirred and heated to 60° C. Air was purged with nitrogen gas three times and replaced with hydrogen gas at 4.5 $kg/cm^2$ (0.45 MPa). The temperature rose to 75-85° C. After 4 hours, the absorption of hydrogen ceased and the hydrogen was replaced by nitrogen gas. The reaction mixture was analyzed by HPLC. HPLC indicated that the mixture contained 66.5% tetrahydro iso-α-acids, which accounted for 228 g of tetrahydro iso-α-acids (96% yield) and small amounts of desoxytetrahydro α-acids.

Example 2

A Solvent-Free Hydrogenation of β-Acids

The autoclave was charged with 183 g β-acid resin and 6.44 g of Pd/C (3.5% loading on dry basis). The mixture was purged with nitrogen gas three times followed by hydrogen gas while the vessel was agitated and heated to 65° C. The mixture was heated and maintained at 85-90° C. under the hydrogen pressure at 4.5 $kg/cm^2$ (0.45 MPa) for 8 hours. Stopped the hydrogenation reaction. HPLC analysis indicated that the reaction failed and found no desoxytetrahydro α-acids.

Example 3

A Solvent-Free Hydrogenation and Hydrogenolysis of a Mixed β-Acids and Iso-α-Acids Resin The autoclave was charged with 159 g iso-α-acids resin (124 g and 0.35 mole of pure iso-α-acids), 66 g of pure β-acid solids (0.16 mole), and 11.28 g of 7.5% Pd/C. It was accounted for 55% iso-α-acids and 29% β-acids (w/w) in the feed resin. The mixture was purged with nitrogen gas three times followed by hydrogen gas while the vessel was agitated and heated to 60° C. The mixture was maintained at 80-90° C. under the hydrogen pressure at 4.5 $kg/cm^2$ (0.45 MPa). After 4 hours the absorption of hydrogen ceased, the mixture was analyzed by HPLC. HPLC analysis showed that the reaction was complete and successful. The mixture was found to contain 121.4 g tetrahydro iso-α-acids (0.34 mole and 97% yield) and 33.6 g desxoytetrahydro α-acids (0.1 mole, 62% yield). The resultant mixture was oxidized and isomerized in an aqueous solution containing 31.6 g KOH, 14.8 g $Mg(OH)_2$, and 800 mL of water with purging air. After 6 hours it produced a total 148.8 g (or 0.42 mole) of tetrahydro iso-α-acids in which 27.4 g (0.076 mole and 47% yield) made from the β-acids.

Example 4

A Solvent-Free Hydrogenation and Hydrogenolysis of a Fraction of Isomerized α-Acids and β-Acids Resin from $CO_2$ Hop Extract 252 g of $CO_2$ hop extract was extracted with 22 g NaOH and 1260 g water. The mixture was stirred at 50-60° C. for 15 min. and stood for 40 min. The first aqueous phase of α-acids and β-acids was separated from an oil layer that contained the remaining α-acids, β-acids, hop oils and waxes originally present in the $CO_2$ hop extract. A second extraction of the oil layer with 5.7 g NaOH and 600 g of water afforded a second aqueous phase of α-acids and β-acids from the hop oils and waxes. Both aqueous phases were combined. To the combined α-acids and β-acids aqueous phase was added 56.4 g $MgSO_4$. The mixture was heated to 85-90° C. with agitation for 1.5 hours. The mixture was acidified with 50% sulfuric acid to form two phases; an oil phase was separated from the aqueous solution to afford 200 g pre-isomerized extract. HPLC analysis indicated that the extract contained 120.4 g iso-α-acids (60%) and 34 g of β-acids (17%).

The autoclave was charged with 200 g of the pre-isomerized extract containing 0.34 mole iso-α-acids and 0.08 mole β-acids and 10.32 g of 7.5% Pd/C. The mixture was purged with nitrogen gas three times while the vessel was agitated and heated to 60° C. The mixture was then heated and maintained at 65-75° C. under the hydrogen pressure at 4.5 kg/cm$^2$ (0.45 MPa). After 4 hours the absorption of hydrogen ceased, the reaction was stopped and a sample was analyzed by HPLC. The HPLC analysis showed the reaction was complete. The mixture was found to contain 111.5 g tetrahydro iso-α-acids (0.31 mole, 93% yield) and 27.04 g desoxytetrahydro α-acids (0.078 mole, 94% yield). To the mixture was added an aqueous solution containing 32.6 g KOH, 12.1 g Mg(OH)$_2$, and 700 mL of water and then oxidized/isomerized with purging air at 65-75° C. After 6 hours, it gave rise to 123.1 g total tetrahydro iso-α-acids in which 11.6 g (40% yield) resulted from the β-acids.

Example 5

A Solvent-Free Hydrogenation and Hydrogenolysis of a Fraction of Nonisomerized α-Acids and β-Acids Resin from CO$_2$ Hop Extract 293 g CO$_2$ of hop extract was extracted with 24.6 g NaOH and 900 g water. The mixture was stirred at 50-60° C. and stood for 40 min. The first extraction of the α-acids and the β-acids aqueous solution was separated from an oil phase. A second extraction of the oil phase was repeated with 5.7 g NaOH and 380 g water. A second aqueous phase of the α-acids and the β-acids was separated from the remainder. Both aqueous phases were combined and then acidified to form two phases. After phase separation, the oil phase afforded 213 g extract which contained 113 g α-acids (53%) and 37.3 g β-acids (17.5%) by HPLC.

The autoclave was charged with the 213 g resin and 13.31 g of 7.5% Pd/C. The mixture was purged with nitrogen gas three times while the vessel was agitated and heated to 60° C. The mixture was heated and maintained at 80-90° C. under the hydrogen pressure 4.5 kg/cm$^2$ (0.45 MPa). After 4 hours, the reaction was worked out and analyzed by HPLC. HPLC analysis showed the hydrogenolysis of the β-acids reaction was complete and form desoxytetrahydro α-acids, but the α-acids decomposed to undesirable compounds. It demonstrated that the α-acids can be as effective as a solvation agent and acid donor to facilitate the hydrogenolysis of the β-acids, but the side-products are unwanted.

Example 6

A Solvent-Free Hydrogenation and Hydrogenolysis of a Mixed β-Acids and Dihydro Iso-α-Acids Resin The autoclave was charged with 333 g resin (containing 173.2 g dihydro iso-α-acids and 91.9 g β-acids) and 20.5 g of 7.5% Pd/C. The mixture was purged with nitrogen gas three times followed by hydrogen gas while the vessel was agitated and heated to 60° C. The mixture was heated and maintained at 80-90° C. under the hydrogen pressure at 7.0 kg/cm$^2$ (0.70 MPa). After 4 hours the absorption of hydrogen ceased and the reaction was stopped. HPLC analysis showed the reaction was complete. The final mixture was found to contain 162.5 g hexahydro iso-α-acids (93% yield) and 59.5 g desxoytetrahydro α-acids (65% yield).

Example 7

Separation of Hexahydro Iso-α-Acids and Desoxytetrahydro α-Acids

To 50 g of a hydrogenated mixture containing 20.42 g hexahydro iso-α-acids, 5.28 g desoxytetrahydro iso-α-acids and the spent Pd/C catalyst were added 4.74 g KOH and 500 ml water with stirring at 800 rpm and heated to 75° C. for 30 min. The mixture was then allowed to stand and cool. After decantation, it afforded 518 g of aqueous solution from 31 g dark oil-solid residue. HPLC analysis indicated that the aqueous solution contained 3.14% (w/w) of hexahydro iso-α-acids, or 16.27 g (80% extraction yield) and 0.16 g desoxytetrahydro α-acids (0.03% yield). The residue contained 16.58% desoxytetrahydro α-acids, or 5.14 g (97% yield), and 3.98 g (12.9% yield) of remaining hexahydro iso-α-acids.

Example 8

Separation of Tetrahydro Iso-α-Acids and Desxoytetrahydro α-Acids and Auto-Oxidation/Isomerization of Desoxytetrahydro α-Acids into Tetrahydro Iso-α-Acids To 21 g of a hydrogenated mixture containing 11.72 g of tetrahydro iso-α-acids, 1.71 g of desoxytetrahydro α-acids, and the spent Pd/C catalyst, was added 10 times the amount of water and 1.84 g KOH. The mixture was stirred at pH 7.8 for 30 min. It was then allowed to stand for 30 min to form two phases: an aqueous and a dark oil phase. A 225 g aqueous phase containing 9.61 g (82% yield) tetrahydro iso-α-acids and 0.016 g (0.007%) desoxytetrahydro α-acids was separated and acidified to recover as an oil resin from the aqueous solution. The resin was then formulated in a KOH solution to produce 100 g of 9.5% (w/w) concentration of tetrahydro iso-α-acids as a commercial product (derived from α-acids). The 9 g dark oily residue containing 2.21 g of the remaining tetrahydro iso-α-acids (18%) and 1.7 g desoxytetrahydro α-acids (nearly quantitative yield) was added 10 times of the amount of water and 1.90 g KOH with stirring and heated to 95-100° C. in air for 4-6 hours. It was discovered that desoxytetrahydro α-acids were converted to tetrahydro iso-α-acids without adding magnesium salt. The spent Pd/C catalyst was filtered and the filtrate was acidified to recover as an oily resin. To the oil 0.54 g KOH and water was added and mixed at 60-100° C. to produce 40 g of 9.5% (w/w) concentration of tetrahydro iso-α-acids as a commercial product (combined from α-acids and β-acids).

Example 9

Separation of Tetrahydro Iso-α-Acids and Desxoytetrahydro α-Acids

To 23 g of a hydrogenated mixture containing 12.20 g of tetrahydro iso-α-acids, 3.73 g of desoxytetrahydro α-acids, and the spent Pd/C catalyst were added and mixed with 8 times the amount of water and 1.23 g KOH (at pH 6.8). The mixture was stirred and heated to 75-100° C. for 30 min. and allowed to stand and cool to form two phases. After decantation, a 195 g of aqueous phase was obtained, which contained 7.59 g (62% yield) tetrahydro iso-α-acids and 0.005 g (0.010%) desoxytetrahydro α-acids. And the remaining 15 g residue contained 4.60 g (38%) remaining tetrahydro iso-α-acids and 3.24 g desxoytetrahydro α-acids (87% yield.)

The foregoing examples have been for purpose of illustration and a number of changes can be made without departing from the spirit and scope of the present invention.

In the hydrogenation and hydrogenolysis step, for example, in place of a 7.5% palladium on carbon (7.5% Pd/C) catalyst, the noble metal catalyst may be used containing from 1% Pd/C to 20% Pd/C and loading from about 1% to 20% by weight. To be safe and controllable, a stream of hydrogen and $CO_2$ mixture may be used other than the hydrogen gas due to an extremely and rapidly exothermic reaction, particularly, in the absence of solvents. Other noble metal catalysts that can be used under mild hydrogenation conditions include Pd/alumina, Pd/silica gel, Pt/C, Ru/C, and Ni/C catalysts; however, the Pd/C is FDA allowed. In addition, the pressure of the hydrogen gas or the hydrogen and $CO_2$ mixture during the hydrogenation and hydrogenolysis may be different than the 4.5 kg/cm$^2$ (0.45 MPa) in these examples. Preferably, a mild pressure between 0 and 200 kg/cm$^2$ (0 to 20 MPa) is used. The spent (used) noble metal catalyst does not filtered out and remains for catalyzing the auto-oxidation/isomerization reaction.

It will be apparent for those skilled in the art that a method of converting α-acids derivatives and β-acids to tetrahydro iso-α-acids and hexahydro iso-α-acids described here are an improvement and depart from the prior art methods because of, but not limited to, the following reasons.
1. The one-step hydrogenolysis and hydrogenation of the β-acids and the α-acids derivatives step is free of solvents (e.g., organic, alcohols, liquid/supercritical $CO_2$ and water) and eliminates using corrosive inorganic acids (e.g., HCl, $H_2SO_4$, and $H_3PO_4$);
2. The composition of the α-acids derivatives facilities the liquidity and acidity of the hydrogenolysis of the β-acids and lends valuable hydrogenated co-products;
3. The one-step auto-oxidation and isomerization step uses no peracids, lead, calcium, or magnesium salts, but in the presence of the spent noble metal catalyst.
4. The hydrogenation/hydrogenolysis, the auto-oxidation/isomerization, and the formulation can be successively performed in one reactor (one-pot);
5. The benefits are significant with less costs, more yield, high productivity, and increasing hop values.

Certain terminology is used herein for purposes of reference only, and thus is not intended to be limiting. For example, terms such as "upper", "lower". "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A method for preparing tetrahydro iso-α-acids and hexahydro iso-α-acids comprising the steps of:
    performing a direct hydrogenation and hydrogenolysis reaction of a fluidized hop resin comprising β-acids and a selected organic acid, a hydrogen, and a noble metal catalyst to form a first mixture;
    reacting the first mixture to form a second mixture comprising desoxytetrahydro α-acids resin, the organic acid and a spent noble metal catalyst;
    suspending the second mixture in an aqueous alkaline solution to thereby auto-oxidize/isomerize the desoxytetrahydro α-acids to form a third mixture comprising a tetrahydro iso-α-acids solution and the spent noble metal catalyst;
    recovering the tetrahydro iso-α-acids and the organic acid aqueous solution from the spent noble metal catalyst in the third mixture;
    acidifying the organic acid aqueous solution to free the tetrahydro iso-α-acids resin from the organic acid; and
    reducing the tetrahydro iso-α-acids to a hexahydro iso-α-acids resin.

2. The method of claim 1, wherein the organic acid is selected from a group consisting of formic acid, acetic acid, fatty acids, hop α-acids, and hop α-acids derivatives, preferably hop α-acids derivatives.

3. The method of claim 1, wherein the fluidized hop resin is composed of about 5% to about 95% or about 1:20 to about 20:1 by weight of β-acids and a selected organic acid at a temperature between about 20° to about 100° C.

4. The method of claim 1, wherein the first mixture for the hydrogenation and hydrogenolysis reaction is free of inorganic acids and solvents.

5. The method of claim 1, wherein the first mixture is reacted at a temperature between about 35° to about 100° C. and a hydrogen pressure or a stream of hydrogen and $CO_2$ mixture between about 0 to about 200 kg/cm$^2$ (about 0 to about 20 MPa).

6. The method of claim 1, wherein the second mixture is auto-oxidized/isomerized by the spent noble metal catalyst without adding peracids, lead, calcium, or magnesium salts in a pH of about 8 to about 11 aqueous alkaline solution at a temperature between about 55° to about 100° C.

7. The method of claim 1, further comprising the steps of
    applying a pH partition separating the organic acids from the second mixture;
    suspending the second mixture in an aqueous alkaline solution having a pH of about 5 to about 11 and a temperature of about 35° to about 100° C. to thereby separating the organic acids solution from a residue;
    re-suspending the residue containing the desoxytetrahydro α-acids and the spent noble metal catalyst in an aqueous alkaline solution having a pH of about 8 to about 11 and a temperature of about 55° to about 100° C. to thereby auto-oxidize/isomerize to form a tetrahydro iso-α-acids solution; and recovering the tetrahydro iso-α-acid aqueous solution from the spent noble metal catalyst; and reducing the tetrahydro iso-α-acids to a hexahydro iso-α-acids resin.

8. A method of making tetrahydro iso-α-acids and hexahydro iso-α-acids comprising the steps of forming a fluidized hop resin mixture comprised of β-acids and iso-α-acids, a hydrogen, and a noble metal hydrogenation catalyst, and defining a first mixture;

reacting the first mixture to thereby hydrogenate and hydrogenolyze the β-acids and the iso-α-acids to form a desoxytetrahydro α-acids and a tetrahydro iso-α-acids resin, respectively, and defining a second mixture also including a spent noble metal catalyst;

suspending the second mixture in an aqueous alkaline solution having a pH of about 8 to about 11 and at a temperature of about 55° to about 100° C. to thereby auto-oxidize/isomerize the desoxytetrahydro α-acids to form a tetrahydro iso-α-acids solution (made from the β-acids), and forming a third mixture containing the tetrahydro iso-α-acids (derived from the α-acids) and the spent noble metal catalyst;

recovering a total tetrahydro iso-α-acid aqueous solution from the spent noble metal catalyst in the third mixture; and reducing the total tetrahydro iso-α-acids solution to a hexahydro iso-α-acids resin.

9. The method of claim 8, wherein the fluidized hop resin comprised of β-acids and iso-α-acids is between about 5% to about 95% or between about 1:20 to about 20:1 by weight at a temperature of about 20° to about 100° C.

10. The method of claim 8, wherein the first mixture for the hydrogenation and hydrogenolysis reaction is free of inorganic acids and solvents.

11. The method of claim 8, wherein the first mixture is reacted at a temperature of about 35° to about 100° C. and a hydrogen pressure or a stream of hydrogen and $CO_2$ mixture of about 0 to about 200 kg/cm² (about 0 to about 20 MPa).

12. The method of claim 8, wherein the second mixture is auto-oxidized/isomerized by the spent noble metal catalyst without adding peracids, lead, calcium, or magnesium salts in a pH of about 8 to about 11 aqueous alkaline solution and at a temperature between about 55° to about 100° C.

13. The method of claim 8, further comprising of the steps of applying a pH partition separating the tetrahydro iso-α-acids from the second mixture;

suspending the second mixture in an aqueous alkaline solution having a pH of about 5 to about 11 and a temperature of about 35° to about 100° C. to thereby recover a tetrahydro iso-α-acids aqueous solution (derived from the α-acids) from a residue;

re-suspending the residue containing the desoxytetrahydro α-acids and the spent noble metal catalyst in an aqueous alkaline solution having a pH of abut 8 to about 11 and a temperature of about 550 to about 100° C. to thereby auto-oxidize/isomerize to a tetrahydro iso-α-acids solution;

recovering the tetrahydro iso-α-acid aqueous solution (derived from the β-acids) from the spent noble metal catalyst; and reducing the tetrahydroiso-α-acids to a hexahydro iso-α-acids resin.

14. A method of making hexahydro iso-α-acids and tetrahydro iso-α-acids comprising the steps of forming a fluidized hop resin comprising β-acids and dihydro iso-α-acids, a hydrogen, and a noble metal hydrogenation catalyst, defining a first mixture;

reacting the first mixture to thereby hydrogenate and hydrogenolyze the β-acids and the dihydro iso-α-acids to a desoxytetrahydro α-acids and a hexahydro iso-α-acids resin, respectively, and defining a second mixture also including a spent noble metal catalyst;

suspending the second mixture in an aqueous alkaline solution having a pH of about 8 to about 11 and a temperature of about 55° to about 100° C. to thereby auto-oxidize/isomerize the desxoytetrahydro α-acids to a tetrahydro iso-α-acids solution (made from the β-acids), and forming a third mixture comprising the hexahydro iso-α-acids (derived from the α-acids) and the spent noble metal catalyst; and recovering the tetrahydro iso-α-acid and the hexahydro iso-α-acids solution from the spent noble metal catalyst in the third mixture.

15. The method of claim 14, wherein the fluidized hop resin composing β-acids and dihydroiso-α-acids is between about 5% to about 95% or between about 1:20 to about 20:1 by weight at a temperature of about 20° to about 100° C.

16. The method of claim 14, wherein the first mixture for the hydrogenation and hydrogenolysis reaction is free of inorganic acids and solvents.

17. The method of claim 14, wherein the first mixture is reacted at a temperature of about 35° to about 100° C. and a hydrogen pressure or a stream of hydrogen and $CO_2$ mixture of about 0 to 200 kg/cm² (0 to 20 MPa).

18. The method of claim 14, wherein the second mixture is auto-oxidized/isomerized by the spent noble metal catalyst without adding peracids, lead, calcium, or magnesium salts in a pH of about 8 to about 11 aqueous alkaline solution at a temperature between 55° to 100° C.

19. The method of claim 14, further comprising the steps of applying a pH partition separating the hexahydro iso-α-acids from the second mixture;

suspending the second mixture in an aqueous alkaline solution having a pH of about 5 to about 11 and a temperature of about 35° to about 100° C. to thereby recover the hexahydro iso-α-acids aqueous solution (derived from the α-acids) from a residue;

re-suspending the residue containing the desoxytetrahydro α-acids and the spent noble metal catalyst in an aqueous alkaline solution having a pH of abut 8 to about 11 and a temperature of about 55° to about 100° C. to thereby auto-oxidize/isomerize to form tetrahydro iso-α-acids solution; and recovering the tetrahydro iso-α-acid aqueous solution (derived from β-acids) from the spent noble metal catalyst.

* * * * *

UNITED STATES PATENT AND TRADEMARK OFFICE
CERTIFICATE OF CORRECTION

| | | |
|---|---|---|
| PATENT NO. | : 9,222,064 B1 | Page 1 of 1 |
| APPLICATION NO. | : 14/461944 | |
| DATED | : December 29, 2015 | |
| INVENTOR(S) | : Patrick L. Ting | |

It is certified that error appears in the above-identified patent and that said Letters Patent is hereby corrected as shown below:

<u>IN THE CLAIMS</u>

CLAIM 13, Col. 15, Line 59

Delete "550" and substitute therefor

--55°--

Signed and Sealed this
Thirty-first Day of May, 2016

Michelle K. Lee
*Director of the United States Patent and Trademark Office*